US008782509B2

(12) United States Patent
Tang

(10) Patent No.: US 8,782,509 B2
(45) Date of Patent: Jul. 15, 2014

(54) TABLE GRAPHICS MANAGEMENT METHOD AND APPARATUS

(71) Applicant: Huawei Technologies Co., Ltd., Guangdong (CN)

(72) Inventor: Wenfang Tang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/950,125

(22) Filed: Jul. 24, 2013

(65) Prior Publication Data

US 2013/0311865 A1 Nov. 21, 2013

Related U.S. Application Data

(63) Continuation of application No. PCT/CN2012/074369, filed on Apr. 19, 2012.

(51) Int. Cl.
*G06F 17/00* (2006.01)

(52) U.S. Cl.
USPC ............ 715/213; 715/212; 715/216; 715/220

(58) Field of Classification Search
CPC ..... G09F 3/0488; G06F 17/11; G06F 17/246; G06F 17/30572
USPC .................. 715/200, 212, 216, 220
See application file for complete search history.

(56) References Cited

U.S. PATENT DOCUMENTS

| | | | | |
|---|---|---|---|---|
| 5,757,432 A | * | 5/1998 | Dulong et al. | 348/384.1 |
| 5,815,421 A | * | 9/1998 | Dulong et al. | 708/520 |
| 6,070,175 A | * | 5/2000 | Mezei | 715/205 |
| 6,298,342 B1 | * | 10/2001 | Graefe et al. | 707/602 |
| 6,687,558 B2 | * | 2/2004 | Tuszynski | 700/97 |
| 6,748,389 B1 | * | 6/2004 | Cesare et al. | 707/809 |
| 7,010,760 B2 | * | 3/2006 | Arnstein et al. | 715/853 |

(Continued)

FOREIGN PATENT DOCUMENTS

| | | |
|---|---|---|
| CN | 1487392 A | 4/2004 |
| CN | 101996031 A | 3/2011 |

OTHER PUBLICATIONS

Unknown, How to Transpose Data in a Google Spreadsheet, retreived from the internet on Nov. 18, 2013, 2 pages.*

(Continued)

*Primary Examiner* — Stephen Hong
*Assistant Examiner* — Gregory J Vaughn
(74) *Attorney, Agent, or Firm* — Leydig, Voit & Mayer, Ltd.

(57) ABSTRACT

Embodiments of the present invention provide a table graphics management method and apparatus. The table graphics management method includes: displaying a table on a display apparatus; detecting a control track for the table input by an input device; determining a moving direction of the control track according to the detected control track; and along the moving direction of the control track, transposing original information in the frames of the row that are sequentially arranged along the first dimension into the frames of the column that are sequentially arranged along the second dimension, and transposing original information in the frames of the column that are sequentially arranged along the second dimension into the frames of the row that are sequentially arranged along the first dimension, so as to acquire a transposed table; and displaying a transposed table on the display apparatus.

22 Claims, 8 Drawing Sheets

(56) References Cited

U.S. PATENT DOCUMENTS

| | | |
|---|---|---|
| 7,614,006 B2 | 11/2009 | Molander |
| 8,209,661 B2 * | 6/2012 | Smialek et al. ............... 717/106 |
| 2004/0036681 A1 | 2/2004 | Kluttz et al. |
| 2005/0246149 A1 * | 11/2005 | Tuszynski .................. 703/2 |
| 2006/0184889 A1 | 8/2006 | Molander |
| 2007/0118510 A1 * | 5/2007 | Li et al. ..................... 707/3 |
| 2008/0222509 A1 | 9/2008 | Nguyen et al. |
| 2011/0050599 A1 | 3/2011 | Sip |
| 2013/0013993 A1 * | 1/2013 | Oh .............................. 715/212 |

OTHER PUBLICATIONS

Unknown, Microsoft Excel Transpose Function, retreived from the internet on Nov. 18, 2013, 2 pages.*

* cited by examiner

10A

| Title 1 | Title 2 |
|---------|---------|
| A | E |
| B | F |
| C | G |
| D | H |

| Title 1 | A | B | C | D |
|---------|---|---|---|---|
| Title 2 | E | F | G | H |

| D | C | B | A | Title 1 |
|---|---|---|---|---------|
| H | G | F | E | Title 2 |

|  | Title 1 | Title 2 |
|---|---|---|
| 90-degree clockwise transposing | A | E |
| 90-degree anticlockwise transposing | B | F |
| 270-degree clockwise transposing | C | G |
| 270-degree anticlockwise transposing | D | H |

Title 1 — 12  
Title 2 — 11  
| Title 1 | Title 2 |
|---|---|
| A | E |
| B | F |
| C | G |
| D | H |

| Title 1 | Title 2 |
|---|---|
| A | E |
| B | F |
| C | G |
| D | H |

| Title 1 | Title 2 |
|---|---|
| A | E |
| B | F |
| C | G |
| D | H |

FIG. 7D
FIG. 7E
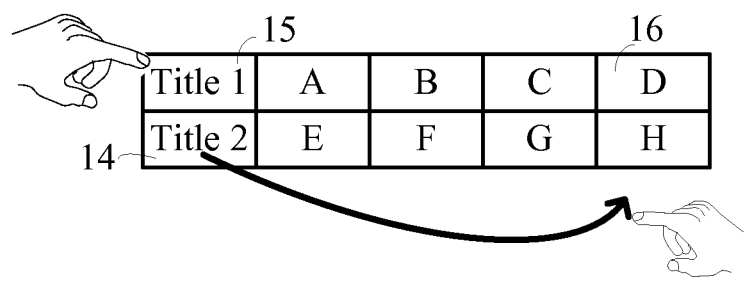
FIG. 7F

TABLE GRAPHICS MANAGEMENT METHOD AND APPARATUS

CROSS-REFERENCE TO RELATED APPLICATIONS

This application is a continuation of International Application No. PCT/CN2012/074369, filed on Apr. 19, 2012, which is hereby incorporated by reference in its entirety.

FIELD OF THE INVENTION

The present invention relates to the field of an electronic document application, and in particular, to a table graphics management method and apparatus in an electronic document.

BACKGROUND OF THE INVENTION

When an electronic text editing tool is used for writing a document, a user often inserts some tables as supplemental illustration. Because text content may be adjusted, a table may be adjusted when a document is being edited, such as according to a relevant specification or requirement. The adjustment may be as follows: the content of rows is converted into the content of columns, or the content of columns is converted into the content of rows, or a table header of rows or columns is cancelled. Currently, how to ensure the quick management of table graphics on the premise of unchanged content of a table in an electronic text editing tool becomes a difficulty of text editing.

SUMMARY OF THE INVENTION

Embodiments of the present invention provide a table graphics management method and apparatus, which can quickly implement table graphics management.

In an aspect, a table graphics management method is provided, including: displaying a table on a display apparatus, in which the table has multiple rows and multiple columns, each of the rows includes multiple frames that are sequentially arranged along a first dimension, each of the columns includes multiple frames that are sequentially arranged along a second dimension, and the second dimension is vertical to the first dimension, in which the frames of the rows and the columns are filled with information; detecting a control track for the table input by an input device; determining a moving direction of the control track according to the detected control track; and along the moving direction of the control track, transposing original information in the frames of the rows that are sequentially arranged along the first dimension into the frames of the columns that are sequentially arranged along the second dimension, and transposing original information in the frames of the columns that are sequentially arranged along the second dimension into the frames of the rows that are sequentially arranged along the first dimension, so as to acquire a transposed table; and displaying the transposed table on the display apparatus.

In another aspect, a table graphics management apparatus is provided, including a displaying module, an input device, a detecting module and a transposing module, in which the displaying module is configured to display a table on a display apparatus, in which the table has multiple rows and multiple columns, each of the rows includes multiple frames that are sequentially arranged along a first dimension, each of the columns includes multiple frames that are sequentially arranged along a second dimension, and the second dimension is vertical to the first dimension, in which the frames of the rows and the columns are filled with information; and further configured to display a transposed table on the display apparatus; the input device is configured to receive a control track for the table; the detecting module is configured to detect the control track for the table input by the input device, and determine a moving direction of the control track according to the control track; and the transposing module is configured to, along the moving direction of the control track, transpose original information in the frames of the rows that are sequentially arranged along the first dimension into the frames of the columns that are sequentially arranged along the second dimension, and transpose original information in the frames of the columns that are sequentially arranged along the second dimension into the frames of the rows that are sequentially arranged along the first dimension, so as to acquire the transposed table.

In another aspect, a table graphics management method is provided, including: displaying a table on a display apparatus, in which the table has multiple rows and multiple columns, each of the rows includes multiple frames that are sequentially arranged along a first dimension, each of the columns includes multiple frames that are sequentially arranged along a second dimension, and the second dimension is vertical to the first dimension, in which the frames of the rows and the columns are filled with information; receiving a selection input by an input device, and generating a transposing selection frame suspended at the periphery of the table according to the selection, in which the transposing selection frame includes a transposing manner option for the rows and the columns of the table; receiving a selection for the transposing manner option in the transposing selection frame, and performing table transposing in a transposing manner selected according to the selection, so as to acquire a transposed table, in which the table transposing includes: transposing original information in the frames of the rows that are sequentially arranged along the first dimension into the frames of the columns that are sequentially arranged along the second dimension, and transposing original information in the frames of the columns that are sequentially arranged along the second dimension into the frames of the rows that are sequentially arranged along the first dimension; and displaying the transposed table on the display apparatus.

In another aspect, a table graphics management apparatus is provided, including a displaying module, a generating module and a transposing module, in which the displaying module is configured to display a table on a display apparatus, in which the table has multiple rows and multiple columns, each of the rows includes multiple frames that are sequentially arranged along a first dimension, each of the columns includes multiple frames that are sequentially arranged along a second dimension, and the second dimension is vertical to the first dimension, in which the frames of the rows and the columns are filled with information; and further configured to display a transposed table on the display apparatus; the generating module is configured to receive a selection input by an input device, and generate a transposing selection frame suspended at the periphery of the table according to the selection, in which the transposing selection frame includes a transposing manner option for the rows and the columns of the table; the transposing module is configured to receive a selection for the transposing manner option in the transposing selection frame, and perform table transposing in a transposing manner selected according to the selection, so as to acquire a transposed table, in which the table transposing includes: transposing original information in the frames of the rows that are sequentially arranged along the first dimension into the frames of the columns that are sequentially arranged along the second dimension, and transposing original information in the frames of the columns that are sequentially arranged along the second dimension into the frames of the rows that are sequentially arranged along the first dimension.

The foregoing technical solutions may directly perform table transposing in a text editing tool based on an input of a user, thereby quickly and conveniently implementing table graphics management in text editing, and providing convenience for the user.

BRIEF DESCRIPTION OF THE DRAWINGS

To describe the technical solutions in the embodiments of the present invention more clearly, accompanying drawings are required in description of the embodiments or the prior art are briefly introduced below. The accompanying drawings in the following description are merely some embodiments of the present invention, and a person skilled in the art may further obtain other drawings according to these accompanying drawings without making creative efforts.

FIG. 1A to FIG. 1C are schematic diagrams of a table according to an embodiment of the present invention;

FIG. 4A to FIG. 4G are schematic diagrams of table graphics management according to an embodiment of the present invention;

FIG. 7A to FIG. 7F are schematic diagrams of table graphics management according to an embodiment of the present invention.

DETAILED DESCRIPTION OF THE EMBODIMENTS

Figure 2:
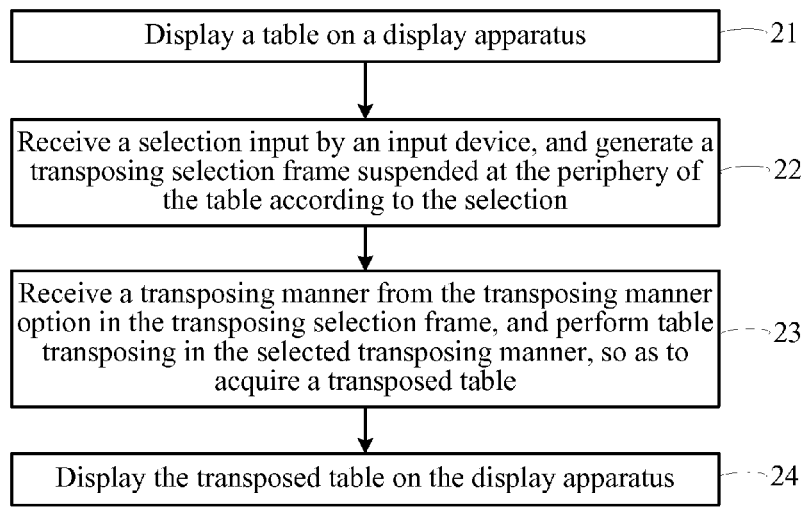
FIG. 2 is a schematic flowchart of a table graphics management method according to an embodiment of the present invention.

The technical solutions under the present invention are described below with reference to the accompanying drawings. The embodiments described below are part of but not all of embodiments of the present invention. All other embodiments, which can be derived by a person skilled in the related art from the embodiments given herein without making any creative effort, shall fall within the protection scope of the present invention.

The following table graphics management method exists in the prior art.

At first, a table is copied in an electronic table tool such as Excel, and then the table is pasted in another place, and during pasting, a "transposing" option is selected. In this way, the content of rows is converted into the content of columns in the table, or the content of columns is converted into the content of a rows.

The method is implemented by an electronic table tool rather than a text editing tool, such as Microsoft Word. The table transposing operation can be performed only when a table is copied and pasted in another place, so the operation is not simple and direct enough, and the operation triggering is relatively covert. As a result, a user cannot quickly implement table management if the user is unfamiliar with the management tool.

An embodiment of the present invention provides a table graphics management method, which can quickly, simply and conveniently implement table graphics management in a text editing tool.

FIG. 1A to FIG. 1C are schematic diagrams of a table according to an embodiment of the present invention. A table includes rows and columns, the direction of the rows is referred to as a first dimension in all the embodiments of the present invention, and the direction of the columns is referred to as a second dimension in all the embodiments of the present invention. The first dimension and the second dimension are vertical to each other.

Rows and columns may include multiple cells in which information may be filled. The cell set in rows or columns and used for redisplaying the attribute of information filled in the rows or columns is referred to as a table header, and the identification content filled in the table header is referred to as table header content.

A table 10A in FIG. 1A is an ordinary form of table, and a table of 5 rows and 2 columns is taken as an example. As shown in FIG. 1A, the table 10A has two table headers 11 and 12 in a rows, the content of the table headers is the title 1 and the title 2, respectively. The table header 11 is the row tail of the rows where the table header 11 is located, and the table header 12 is the row head of the rows where the table header 12 is located and is also the column head of the columns vertical to the rows where the table header 12 is located. The table further includes a cell 13, and the cell 13 is the column tail of the columns where the table header 12 is located.

FIG. 1B is a table 10B with 2 rows and 5 columns, and the table 10B and the table 10A in FIG. 1A are transposed from each other. As shown in FIG. 1B, the table 10B has two table headers 14 and 15 in a columns, the content of the table headers is the same as that in the table headers 11 and 12 in the table 10A, respectively. The table header 14 is the column tail of the columns where the table header 14 is located, and the table header 15 is the column head of the columns where the table header 15 is located and is also the row head of the rows vertical to the columns where the table header 15 is located. The table further includes a cell 16, and the cell 16 is the row tail of the rows where the table header 15 is located.

Alternatively, FIG. 1C is a table 10C which is a table of 2 rows and 5 columns, and the table 10C and the table 10A in FIG. 1A are transposed from each other. As shown in FIG. 1C, the table 10C has two table headers 17 and 18 in columns, content of the table headers is the same as that in the table headers 11 and 12 in the table 10A respectively. The table header 17 is the column tail of the columns where the table header 17 is located, and the table header 18 is the column head of the columns where the table header 18 is located and is also the row tail of the rows vertical to the columns where the table header 18 is located. The table further includes a cell 19, and the cell 19 is the row head of the rows where the table header 18 is located.

The transposing from the table 10A into the table 10B may be referred to as 90-degree anticlockwise transposing along an anticlockwise direction, or may be also referred to as 270-degree clockwise transposing along a clockwise direction, and the transposing is used for transposing the original information in the frames of the rows that are sequentially arranged along the first dimension into the frames of the columns that are sequentially arranged along the second dimension.

The transposing from the table 10B into the table 10A may be referred to as 90-degree clockwise transposing along the clockwise direction, or may be also referred to as 270-degree anticlockwise transposing along the anticlockwise direction, and the foregoing transposing is used for transposing the original information in the frames of the columns that are sequentially arranged along the second dimension into the frames of the rows that are sequentially arranged along the first dimension.

The transposing from the table 10A into the table 10C may be referred to as 90-degree clockwise transposing along the clockwise direction, or may be also referred to as 270-degree anticlockwise transposing along the anticlockwise direction, and the foregoing transposing is used for transposing the original information in the frames of the rows that are sequentially arranged along the first dimension into the frames of the columns that are sequentially arranged along the second dimension.

The transposing from the table 10C into FIG. 10A may be referred to as 90-degree anticlockwise transposing along the anticlockwise direction, or may be also referred to as 270-degree clockwise transposing along the clockwise direction, and the foregoing transposing is used for transposing the original information in the frames of the columns that are sequentially arranged along the second dimension into the frames of the rows that are sequentially arranged along the first dimension.

FIG. 2 is a schematic flowchart of a table graphics management method 20 according to an embodiment of the present invention. The method 20 includes the following content.

21: Display a table on a display apparatus, in which the table has multiple rows and multiple columns, each of the rows includes multiple frames that are sequentially arranged along a first dimension, and each of the columns includes multiple frames that are sequentially arranged along a second dimension. The second dimension is vertical to the first dimension, and the frames of the rows and the columns are filled with information.

22: Receive a selection input by an input device, and generate a transposing selection frame suspended at the periphery of the table according to the selection, in which the transposing selection frame includes a transposing manner option for the rows and the columns of the table.

23: Receive a transposing manner selected from the transposing manner option in the transposing selection frame, and perform table transposing in the selected transposing manner, so as to acquire a transposed table, in which the table transposing includes: transposing original information in the frames of the row that are sequentially arranged along the first dimension into the frames of the column that are sequentially arranged along the second dimension, and transposing original information in the frames of the column that are sequentially arranged along the second dimension into the frames of the row that are sequentially arranged along the first dimension.

24: Display the transposed table on the display apparatus.

The embodiment of the present invention may provide, based on an input of a user, a transposing manner option for table transposing in a text editing tool, thereby quickly and conveniently implementing table graphics management in text editing, and providing convenience for the user.

Alternatively, the receiving selection input by the input device and generating the transposing selection frame suspended at the periphery of the table according to the selection includes: when table header content in the table is selected, generating the transposing selection frame suspended at the periphery of the table, in which the table header content refers to identification content set in a frame of the rows or columns and used to redisplay an attribute of information filled in the frame of the rows or columns.

Alternatively, the transposing manner option in the transposing selection frame includes clockwise transposing and anticlockwise transposing; and the receiving a transposing manner selected from selected from a transposing manner option in the transposing selection frame, and performing the table transposing according to the selected transposing manner includes: implementing the table transposing in a clockwise direction when a selection for the clockwise transposing is received; and implement the table transposing in an anticlockwise direction when a selection for the anticlockwise transposing is received.

Alternatively, the clockwise transposing includes 90-degree clockwise transposing and 270-degree clockwise transposing; and the implementing the table transposing in the clockwise direction when the selection for the clockwise transposing is received includes: implementing the table transposing in a 90-degree clockwise direction when a selection for the 90-degree clockwise transposing is received; and implementing the table transposing in a 270-degree clockwise direction when a selection for the 270-degree clockwise transposing is received.

Alternatively, the implementing the table transposing in the 90-degree clockwise direction when the selection for the 90-degree clockwise transposing is received includes: when the transposing manner selected according to the selection is the 90-degree clockwise transposing, transposing, in a 90-degree clockwise direction, the original information in the frames of the row that are sequentially arranged along the first dimension into the frames of the column that are sequentially arranged along the second dimension, and transposing, in a 90-degree clockwise direction, the original information in the frames of the column that are sequentially arranged along the second dimension into in the frames of the row that are sequentially arranged along the first dimension.

Alternatively, the implementing the table transposing in the 270-degree clockwise direction when the selection for the 270-degree clockwise transposing is received includes: when the transposing manner selected according to the selection is the 270-degree clockwise transposing, transposing, in a 270-degree clockwise direction, the original information in the frames of the row that are sequentially arranged along the first dimension into the frames of the column that are sequentially arranged along the second dimension, and transposing, in a 270-degree clockwise direction, the original information in the frames of the column that are sequentially arranged along the second dimension into in the frames of the row that are sequentially arranged along the first dimension.

Alternatively, the anticlockwise transposing includes 90-degree anticlockwise transposing and 270-degree anticlockwise transposing; and the implementing the table transposing in the anticlockwise direction when the selection for the anticlockwise transposing is received includes: implementing the table transposing in a 90-degree anticlockwise direction when a selection for the 90-degree anticlockwise transposing is received; and implementing the table transposing in a 270-degree anticlockwise direction when a selection for the 270-degree anticlockwise transposing is received.

Alternatively, the implementing the table transposing in the 90-degree anticlockwise direction when the selection for the 90-degree anticlockwise transposing is received includes: when the transposing manner selected according to the selection is the 90-degree anticlockwise transposing, 90-degree anticlockwise transposing the original information in the frames of the row that are sequentially arranged along the first dimension into the frames of the column that are sequentially arranged along the second dimension, and 90-degree anticlockwise transposing the original information in the frames of the column that are sequentially arranged along the second dimension into the frames of the row that are sequentially arranged along the first dimension.

Alternatively, the implementing the table transposing in the 270-degree anticlockwise direction when the selection for the 270-degree anticlockwise transposing is received includes: when the transposing manner selected according to the selection is the 270-degree anticlockwise transposing, 270-degree anticlockwise transposing the original information in the frames of the row that are sequentially arranged along the first dimension into the frames of the column that are sequentially arranged along the second dimension, and 270-degree anticlockwise transposing the original information in the frames of the column that are sequentially arranged along the second dimension into the frames of the row that are sequentially arranged along the first dimension.

Figure 3:
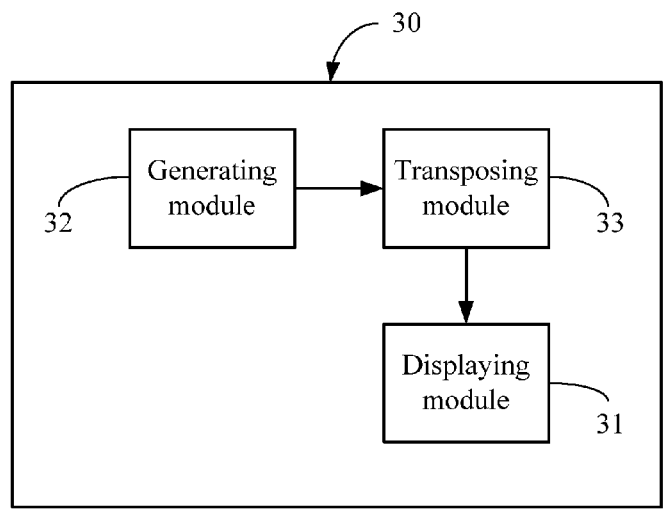
FIG. 3 is a schematic block diagram of a table graphics management apparatus according to an embodiment of the present invention.

FIG. 3 is a schematic block diagram of a table graphics management apparatus 30 according to an embodiment of the present invention. The apparatus 30 includes a displaying module 31, a generating module 32 and a transposing module 33.

The displaying module 31 displays a table on a display apparatus, in which the table has multiple rows and multiple columns, each of the rows includes multiple frames that are sequentially arranged along a first dimension, each of the columns includes multiple frames that are sequentially arranged along a second dimension, and the second dimension is vertical to the first dimension, in which the frames of the rows and the columns are filled with information; and the displaying module 31 is further configured to display a transposed table on the display apparatus.

The generating module 32 receives a selection input by an input device, and generates a transposing selection frame suspended at the periphery of the table according to the selection, in which the transposing selection frame includes a transposing manner option for the rows and the columns of the table.

The transposing module 33 receives a selection for the transposing manner option in the transposing selection frame, and performs table transposing in a transposing manner selected according to the selection, so as to acquire a transposed table, in which the table transposing includes: transposing original information in the frames of the row that are sequentially arranged along the first dimension into the frames of the column that are sequentially arranged along the second dimension, and transposing original information in the frames of the column that are sequentially arranged along the second dimension into the frames of the row that are sequentially arranged along the first dimension.

The embodiment of the present invention may provide, based on an input of a user, a transposing manner option for table transposing in a text editing tool, thereby quickly and conveniently implementing table graphics management in text editing, and providing convenience for the user.

Alternatively, when table header content in the table is selected, the generating module 32 generates the transposing selection frame suspended at the periphery of the table, in which the table header content refers to identification content set in a frame of the rows or columns and used to redisplay an attribute of information filled in the frame of the rows or columns.

Alternatively, the transposing manner option in the transposing selection frame generated by the generating module 32 includes clockwise transposing and anticlockwise transposing, and accordingly, the transposing module 33 is configured to implement the table transposing in a clockwise direction when a selection for the clockwise transposing is received; and implement the table transposing in an anticlockwise direction when a selection for the anticlockwise transposing is received.

Alternatively, the clockwise transposing includes 90-degree clockwise transposing and 270-degree clockwise transposing; and the implementing the table transposing in the clockwise direction when the selection for the clockwise transposing is received includes: implementing the table transposing in a 90-degree clockwise direction when a selection for the 90-degree clockwise transposing is received; and implementing the table transposing in a 270-degree clockwise direction when a selection for the 270-degree clockwise transposing is received.

Alternatively, the implementing the table transposing in the 90-degree clockwise direction when the selection for the 90-degree clockwise transposing is received includes: when the transposing manner selected according to the selection is the 90-degree clockwise transposing, displaying, by the displaying module 31, transposing, in a 90-degree clockwise direction, the original information in the frames of the row that are sequentially arranged along the first dimension into the frames of the column that are sequentially arranged along the second dimension, and transposing, in a 90-degree clockwise direction, the original information in the frames of the column that are sequentially arranged along the second dimension into the frames of the row that are sequentially arranged along the first dimension.

Alternatively, the implementing the table transposing in the 270-degree clockwise direction when the selection for the 270-degree clockwise transposing is received includes: when the transposing manner selected according to the selection is the 270-degree clockwise transposing, displaying, by the displaying module 31, transposing, in a 270-degree clockwise direction, the original information in the frames of the row that are sequentially arranged along the first dimension into the frames of the column that are sequentially arranged along the second dimension, and transposing, in a 270-degree clockwise direction, the original information in the frames of the column that are sequentially arranged along the second dimension into the frames of the row that are sequentially arranged along the first dimension.

Alternatively, the anticlockwise transposing includes 90-degree anticlockwise transposing and 270-degree anticlockwise transposing; and the implementing the table transposing in the anticlockwise direction when the selection for the anticlockwise transposing is received includes: implementing the table transposing in a 90-degree anticlockwise direction when a selection for the 90-degree anticlockwise transposing is received; and implementing the table transposing in a 270-degree anticlockwise direction when a selection for the 270-degree anticlockwise transposing is received.

Alternatively, the implementing the table transposing in the 90-degree anticlockwise direction when the selection for the 90-degree anticlockwise transposing is received includes: when the transposing manner selected according to the selection is the 90-degree anticlockwise transposing, displaying, by the displaying module 31, 90-degree anticlockwise transposing the original information in the frames of the row that are sequentially arranged along the first dimension into the frames of the column that are sequentially arranged along the second dimension, and 90-degree anticlockwise transposing the original information in the frames of the column that are sequentially arranged along the second dimension into the frames of the row that are sequentially arranged along the first dimension.

Alternatively, the implementing the table transposing in the 270-degree anticlockwise direction when the selection for the 270-degree anticlockwise transposing is received includes: when the transposing manner selected according to the selection is the 270-degree anticlockwise transposing, displaying, by the displaying module 31, 270-degree anticlockwise transposing the original information in the frames of the row that are sequentially arranged along the first dimension into the frames of the column that are sequentially arranged along the second dimension, and 270-degree anticlockwise transposing the original information in the frames of the column that are sequentially arranged along the second dimension into the frames of the row that are sequentially arranged along the first dimension.

For purpose of conciseness, the following describes only the mutual transposing between the table 10A and the table 10B. The mutual transposing between the table 10A and table 10C is similar to that in the following description, and therefore is not described again herein.

FIG. 4A to FIG. 4F are schematic diagrams of table graphics management according to an embodiment of the present invention. The table 10A in FIG. 1A is a displayed table.

Figure 4A:
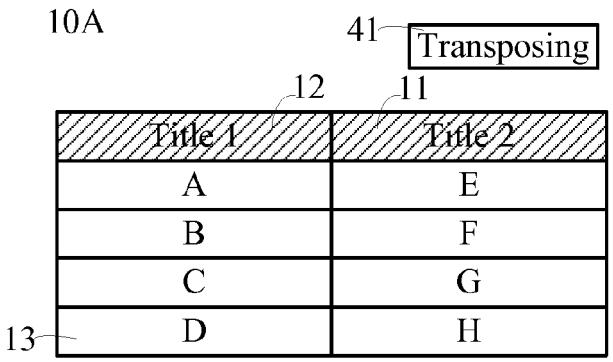

FIG. 4A is a schematic diagram of an intermediate procedure of transposing the table 10A into the table 10B according to an embodiment of the present invention. A user selects table header content of the table headers 11 and 12 in the table 10A through a cursor. As shown in FIG. 4A, for convenience of illustration, the parts in the cells denoted with oblique lines indicate the selected table header content.

Based on a location where the selected table header is located, a transposing selection frame 41 is generated at the periphery of the table 10A.

After an option on the transposing selection frame 41 is selected, the table 10A is transposed into the table 10B in FIG. 1B.

Figure 4B:
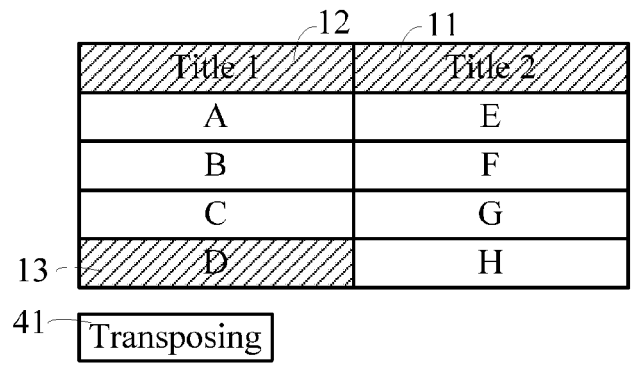

Alternatively, the method shown in FIG. 4B may be further adopted. Different from the embodiment in FIG. 4A, the user selects the table header content in the table 10A through the cursor, and also selects a cell 13 in the table 10A. In this case, after the transposing selection frame 41 is generated at the periphery of the table 10A and the selection on the transposing selection frame 41 is selected, the table 10A is transposed into the table 10B in FIG. 1B.

Figure 4C:
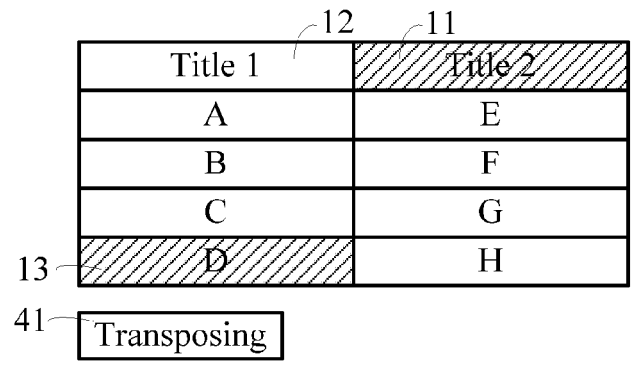

Alternatively, the method shown in FIG. 4C may be further adopted. It may also be simplified to a case that the user selects only the table header 11 and the cell 13, so as to complete the foregoing transposing.

FIG. 4D to FIG. 4F are schematic diagrams of an intermediate procedure of transposing the table 10B in FIG. 1B into the table 10A in FIG. 1A. The table 10B in FIG. 1B is a displayed table.

A user selects table header content of the table headers 14 and 15 in the table 10B through the cursor. As shown in FIG. 4D, for convenience of illustration, the parts of cells denoted with oblique lines indicate the selected table header content here.

Based on a location where the selected table header is located, a transposing selection frame 41 is generated at the periphery of the table 10B.

After a selection on the transposing selection frame 41 is selected, the table 10B is transposed into the table 10A in FIG. 1A.

Alternatively, the method shown in FIG. 4E may be further adopted. Different from the embodiment in FIG. 4D, the user selects the table header content in the table 10B through the cursor and also selects a cell 16 in the table 10B. In this case, after the transposing selection frame 41 is generated at the periphery of the table 10B, and the selection on the transposing selection frame 41 is selected, the table 10B is transposed into the table 10A in FIG. 1A.

Alternatively, the method shown in FIG. 4F may be further adopted. It may also be simplified to a case that the user selects only the table header 14 and the cell 16, so as to complete the foregoing transposing.

Alternatively, the method shown in FIG. 4G may be further adopted. The table is selected through a quick selection button 42 beside the table, the transposing selection frame 41 may be displayed without the need of selecting specific cell content, and after the selection on the transposing selection frame 41 is further selected, the table graphics management is implemented.

The transposing selection frame 41 may include transposing manner options of clockwise transposing and anticlockwise transposing, or may also include only one of the clockwise transposing and the anticlockwise transposing for different application scenarios. The clockwise transposing in the transposing selection frame includes 90-degree clockwise transposing and 270-degree clockwise transposing. The anticlockwise transposing in the transposing selection frame includes 90-degree anticlockwise transposing and 270-degree anticlockwise transposing. Accordingly, the transposing in the embodiments of FIG. 4A to FIG. 4C may be 90-degree anticlockwise transposing or 270-degree clockwise transposing, and the transposing in the embodiments of FIG. 4D to FIG. 4F may be 90-degree clockwise transposing or 270-degree anticlockwise transposing.

The foregoing embodiments all implement the table graphics management by detecting a selected object input by the user.

The embodiment of the present invention may provide, based on an input of a user, a transposing manner option for table transposing in a text editing tool, thereby quickly and conveniently implementing table graphics management in text editing, and providing convenience for the user.

Figure 5:
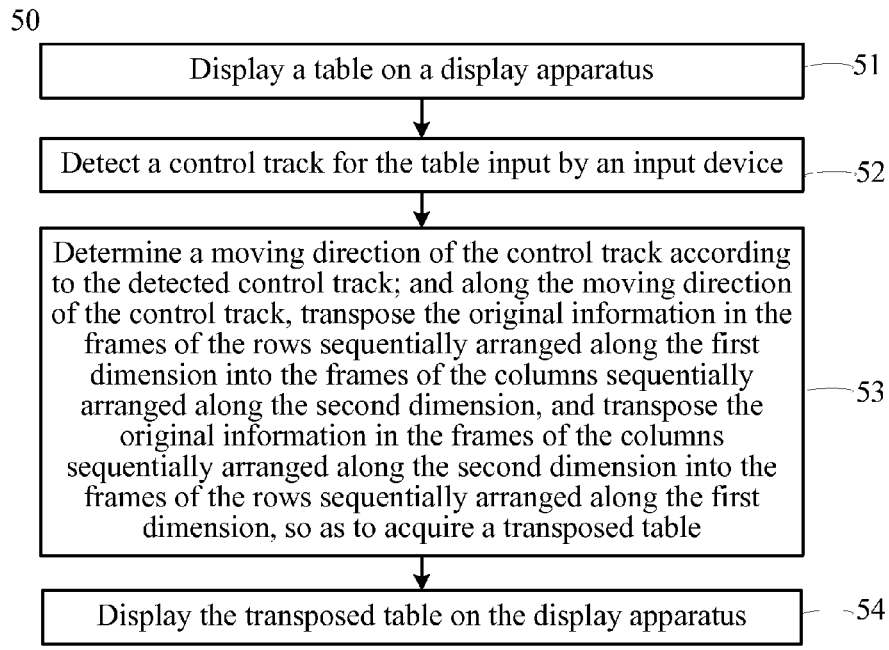
FIG. 5 is a schematic flowchart of a table graphics management method according to an embodiment of the present invention.

FIG. 5 is a schematic flowchart of a table graphics management method 50 according to an embodiment of the present invention. The method 50 includes the following content.

51: Display a table on a display apparatus, in which the table has multiple rows and multiple columns, each of the rows includes multiple frames that are sequentially arranged along a first dimension, each of the columns includes multiple frames that are sequentially arranged along a second dimension, and the second dimension is vertical to the first dimension, in which the frames of the rows and the columns are filled with information.

52: Detect a control track for the table input by an input device.

53: Determine a moving direction of the control track according to the detected control track; and along the moving direction of the control track, transpose original information in the frames of the row that are sequentially arranged along the first dimension into the frames of the column that are sequentially arranged along the second dimension, and transpose original information in the frames of the column that are sequentially arranged along the second dimension into the frames of the row that are sequentially arranged along the first dimension, so as to acquire a transposed table.

54: Display the transposed table on the display apparatus.

The embodiment of the present invention may directly perform table transposing in a text editing tool based on an input of a user, thereby quickly and conveniently implementing table graphics management in text editing, and providing convenience for the user.

Alternatively, the control track input by the input device is as follows: with any one point of the rows of the table where the rows does not intersect the columns of the table as a starting point, drawing through a location where the rows containing the starting point intersects the columns and extending to any one point of the columns where the columns does not intersect the rows containing the starting point; or with any one point of the columns of the table where the columns does not intersect the rows of the table as a starting point, drawing through a location where the columns containing the starting point intersects the rows and extending to any one point of the rows where the rows does not intersect the columns containing the starting point.

Alternatively, the input device is a touch input apparatus, and accordingly, the detecting the control track for the table input by the input device includes: detecting a touch track on the touch input apparatus for the table, in which the touch track is used as the control track for the table.

Alternatively, the detecting the control track for the table input by the input device includes: detecting a first input location input by the input device; and detecting a rotation track that is input by the input device and uses the first input location as a rotation point, in which the rotation track that uses the first input location as the rotation point is used as the control track for the table.

Figure 6:
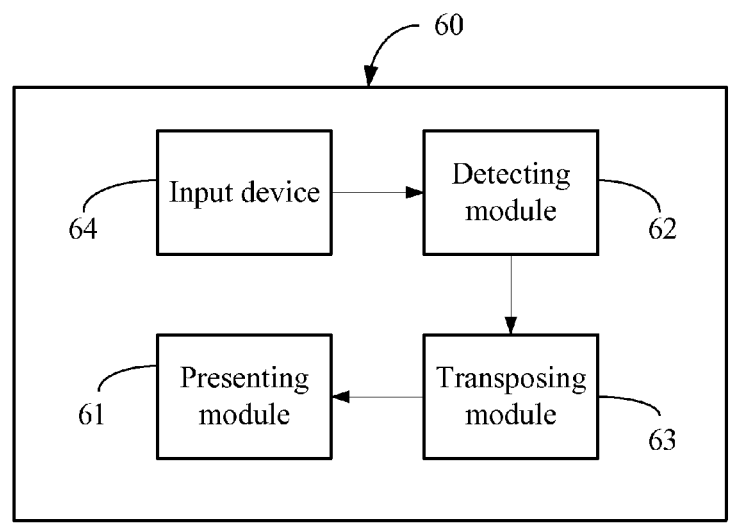
FIG. 6 is a schematic block diagram of a table graphics management apparatus according to an embodiment of the present invention.

FIG. 6 is a schematic block diagram of a table graphics management apparatus 60 according to an embodiment of the present invention. The apparatus 60 includes a displaying module 61, a detecting module 62, a transposing module 63 and an input device 64.

The displaying module 61 displays a table on a display apparatus, in which the table has multiple rows and multiple columns, each of the rows includes multiple frames that are sequentially arranged along a first dimension, each of the columns includes multiple frames that are sequentially arranged along a second dimension, and the second dimension is vertical to the first dimension, in which the frames of the rows and the columns are filled with information; and further displays a transposed table on the display apparatus.

The input device 64 receives a control track for the table.

The detecting module 62 detects the control track received by the input device 64, and determines a moving direction of the control track according to the control track.

The transposing module 63, along the moving direction of the control track detected by the detecting module 62, transposes original information in the frames of the row that are sequentially arranged along the first dimension into the frames of the column that are sequentially arranged along the second dimension, and transposes original information in the frames of the column that are sequentially arranged along the second dimension into the frames of the row that are sequentially arranged along the first dimension, so as to acquire the transposed table.

The embodiment of the present invention may directly perform table transposing in a text editing tool based on an input of a user, thereby quickly and conveniently implementing table graphics management in text editing, and providing convenience for the user.

Alternatively, the control track detected by the detecting module 62 is as follows: with any one point of the rows of the table where the rows does not intersect the columns of the table as a starting point, drawing through a location where the rows containing the starting point intersects the columns and extending to any one point of the columns where the columns does not intersect the rows containing the starting point; or with any one point of the columns of the table where the columns does not intersect the rows of the table as a starting point, drawing through a location where the columns containing the starting point intersects the rows and extending to any one point of the rows where the rows does not intersect the columns containing the starting point.

Alternatively, the input device 64 is a touch input apparatus, and accordingly, the detecting module 62 detects a touch track on the touch input apparatus for the table, in which the touch track is used as the control track for the table.

Alternatively, the detecting module 62 detects a first input location input by the input device 64; and detects a rotation track, input by the input device 64, with the first input location as a rotation point, in which the rotation track that uses the first input location as the rotation point is used as the control track for the table.

For purpose of conciseness, next only the mutual transposing between the table 10A and the table 10B is illustrated, and the mutual transposing between the table 10A and table 10C is similar to that in the following illustration, which is not described again herein.

FIG. 7A to FIG. 7F are schematic diagrams of table graphics management according to an embodiment 70 of the present invention. The table 10A in FIG. 1A is a displayed table.

FIG. 7A is a schematic diagram of an intermediate procedure of transposing the table 10A into the table 10B according to an embodiment of the present invention. A control track input by a user through an input device is a mouse moving track. By pressing on the right button of the mouse to move from the table header 11 in the table 10A to the table header 12, and then loosening the right button of the mouse after moving to the cell 13, the moving track of the mouse is shown by the arrows in FIG. 7A, and the table 10A is transposed into the table 10B in FIG. 1B.

Alternatively, the method shown in FIG. 7B may be further adopted. Different from the embodiment in FIG. 7A, the control track input by the user through the input device is a touch track of the user for the foregoing table on a touch interacting terminal, and when the touch track moves from the table header 11 in the table 10A to the table header 12, and then moves to the cell 13, as shown by the arrows in FIG. 7B, the table 10A is transposed into the table 10B in FIG. 1B.

Alternatively, the method shown in FIG. 7C may be further adopted. Different from the touch track of the embodiment in FIG. 7B, a finger presses on the table header 12 of the table 10A, by using the table header 12 as a rotation center, and then another finger presses on the table header 11 and drags toward the lower left side, that is, a clockwise rotation, as shown by the arrows in FIG. 7C, so as to complete the foregoing transposing.

FIG. 7D to FIG. 7F are schematic diagrams of an intermediate procedure of transposing the table 10B in FIG. 1B into the table 10A in FIG. 1A. The table 10B in FIG. 1B is a displayed table.

FIG. 7D is a schematic diagram of an intermediate procedure of transposing the table 10B into the table 10A according to an embodiment of the present invention. A control track input by a user through an input device is a mouse moving track. By pressing on the right button of the mouse to move from the table header 14 in the table 10B to the table header 15, and then loosening the right button of the mouse after moving to the cell 16, the moving track of the mouse is shown by the arrows in FIG. 7D, and the table 10B is transposed into the table 10A in FIG. 1B.

Alternatively, the method shown in FIG. 7E may be further adopted. Different from the embodiment in FIG. 7D, the control track input by the user through the input device is a touch track of the user for the foregoing table on a touch interacting terminal, and when the touch track moves from the table header 14 in the table 10B to the table header 15, and then moves to the cell 16, as shown by the arrows in FIG. 7E, the table 10B is transposed into the table 10A in FIG. 1A.

Alternatively, the method shown in FIG. 7F may be further adopted. Different from the touch track of the embodiment in 7E, a finger presses on the table header 15 of the table 10B, by using the table header 15 as a rotation center, and then another finger presses on the table header 14 and drags toward the upper right side, that is, an anticlockwise rotation, as shown by the arrows in FIG. 7F, so as to complete the foregoing transposing.

The foregoing embodiments all implement the table graphics management by detecting the control track for the table input by the user through the input device.

The embodiment of the present invention may directly perform table transposing in a text editing tool based on an input of a user, thereby quickly and conveniently implementing table graphics management in text editing, and providing convenience for the user.

Figure 8:
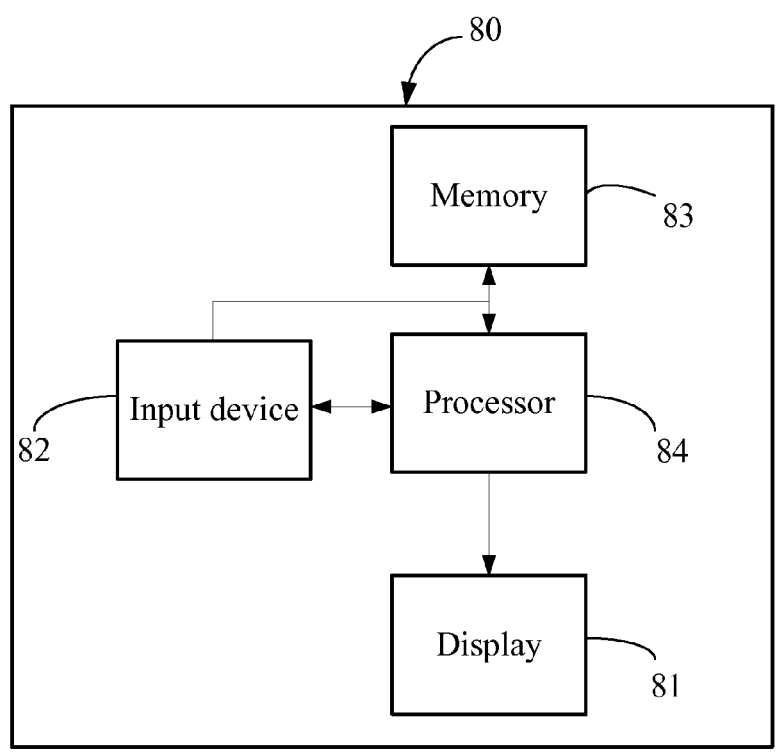
FIG. 8 is a schematic block diagram of a computer system applicable to an embodiment of the present invention.

FIG. 8 is a schematic block diagram of a computer system 80 applicable to an embodiment of the present invention. The computer system 80 at least includes, for example, the following apparatuses: a display 81, an input device 82, a memory 83 and a processor 84.

The display 81 may be suitable apparatuses such as a cathode ray tube (CRT, Cathode Ray Tube) display and a liquid crystal display (LCD, Liquid Crystal Display), and an apparatus which may be configured to display a graphics user interface.

The input device 82 may include any suitable apparatus such as a keyboard, a mouse, a track recognizer, and a voice recognizing interface, and is configured to receive an input of a user, and send the input to the processor.

Particularly, when the computer system 80 is a touch interacting terminal, an interacting touch screen may be the display 81, and may also be the input device 82.

The memory 83 may include an RAM and an ROM, or any fixed storage medium, or a removable storage medium, and is configured to store a program which may execute an embodiment of the present invention or data to be processed in an embodiment of the present invention.

The processor 84 is configured to execute the program of the embodiment of the present invention stored in the memory 83, and perform bidirectional communication with other apparatuses through a bus.

The memory 83 and the processor 84 may also be integrated into a physical module applying an embodiment of the present invention, and the program for implementing the embodiment of the present invention is stored and run on the physical module.

When the computer system 80 implements the method 20, in step 21, the processor 84 enables the display 81 to display a table, in which the table has multiple rows and multiple columns, each of the rows includes multiple frames that are sequentially arranged along a first dimension, each of the columns includes multiple frames that are sequentially arranged along a second dimension, and the second dimension is vertical to the first dimension, in which the frames of the rows and the columns are filled with information; in step 22, the processor 84 receives a selection input by the input device 82, and generates a transposing selection frame suspended at the periphery of the table according to the selection, in which the transposing selection frame includes a transposing manner option for the rows and the columns of the table; in step 23, the processor 84 receives a selection for the transposing manner option in the transposing selection frame, and performs table transposing in a transposing manner selected according to the selection, so as to acquire a transposed table, in which the table transposing includes: transposing original information in the frames of the row that are sequentially arranged along the first dimension into the frames of the column that are sequentially arranged along the second dimension, and transposing original information in the frames of the column that are sequentially arranged along the second dimension into the frames of the row that are sequentially arranged along the first dimension; and in step 24, the processor 84 enables the display 81 to display a transposed table.

When the computer system 80 implements the method 50, in step 51, the processor 84 enables the display 81 to display a table, in which the table has multiple rows and multiple columns, each of the rows includes multiple frames that are sequentially arranged along a first dimension, each of the columns includes multiple frames that are sequentially arranged along a second dimension, and the second dimension is vertical to the first dimension, in which the frames of the rows and the columns are filled with information; in step 52, the processor 84 detects a control track for the table input by the input device 82; in step 53, the processor 84 determines a moving direction of the control track according to the detected control track; and along the moving direction of the control track, transposes the original information in the frames of the row that are sequentially arranged along the first dimension into the frames of the column that are sequentially arranged along the second dimension, and transposes the original information in the frames of the column that are sequentially arranged along the second dimension into the frames of the row that are sequentially arranged along the first dimension, so as to acquire a transposed table; and in step 54, the processor 84 enables the display 81 to display a transposed table.

Through the application of the foregoing computer system, table transposing may be directly performed in a text editing tool based on an input of a user, thereby quickly and conveniently implementing table graphics management in text editing, and providing convenience for the user.

A person skilled in the art may be aware that the various exemplary units and algorithm steps described in conjunction with the embodiments disclosed herein can be implemented by electronic hardware, or a combination of computer software and electronic hardware. Whether the functions are executed by hardware or software depends on particular applications and design constraint conditions of the technical solutions. A person skilled in the art can use different methods to implement the described functions for every particular application, but it should not be considered that the implementation goes beyond the scope of the present invention.

Those skilled in the art are able to clearly understand that, for easy and concise description, the specific working processes of the system, apparatus, and unit described previously may refer to the corresponding processes in the method embodiment, and are not described herein.

In the embodiments provided in the present application, it should be understood that the disclosed system, device, and method may be implemented in other modes. For example, the device embodiment described above is merely exemplary. For example, the division of units is merely a division of logical functions and there may be other division modes in actual applications. For example, multiple units or components may be combined or may be integrated to another system, or some characteristics may be ignored or not executed. In addition, the shown or discussed mutual couplings or direct couplings or communication connections may be implemented via some interfaces. The indirect couplings or communication connections between apparatuses or units may be implemented in electrical, mechanical, or other forms.

The units described as separate parts may or may not be physically separate, and parts displayed as units may or may not be physical units, may be located in one position, or may be distributed on multiple network elements. A part or all of the units may be selected according to the actual needs to achieve the objectives of the solutions of the embodiments.

In addition, function units in the embodiments of the present invention may be integrated into a processing unit, or each of the units may exist alone physically, or two or more units are integrated into a unit.

When being implemented in the form of a software function unit and sold or used as a stand-alone product, the functions may be stored in a computer-readable storage medium. Based on such understanding, the essence of the technical solutions of the present invention, or part that makes contributions to the prior art, or part of the technical solution may be embodied in the form of a software product. The computer software product may be stored in a storage medium, and incorporates several instructions for instructing a computer device (for example, personal computer, server, or network device) to execute all or part of the steps of the method in any embodiment of the present invention. The storage medium may be any medium that is capable of storing program codes, such as a USB flash drive, a removable hard disk, a Read-Only Memory (ROM, Read-Only Memory), a Random Access Memory (RAM, Random Access Memory), a magnetic disk, or an optical disk.

The above descriptions are merely preferred embodiments of the present invention, but the protection scope of the present invention is not limited hereto. Any modification, equivalent replacement, or improvement made by a person skilled in the art within the technical scope disclosed in the present invention shall fall within the protection scope of the present invention. Therefore, the scope of the present invention is subject to the appended claims.

What is claimed is:

1. A table graphics management method, comprising:
   displaying a table on a display apparatus, wherein the table has multiple rows and multiple columns, each of the rows comprises multiple frames that are sequentially arranged along a first dimension, each of the column comprises multiple frames that are sequentially arranged along a second dimension, and the second dimension is vertical to the first dimension, wherein the frame of the rows and the columns are filled with information;
   detecting a control track for the table input by an input device;
   determining a moving direction of the control track according to the detected control track;
   transposing, along the moving direction of the control track, original information in the frames of the row that are sequentially arranged along the first dimension into the frames of the column that are sequentially arranged along the second dimension, and transposing original information in the frames of the column that are sequentially arranged along the second dimension into the frames of the row that are sequentially arranged along the first dimension, so as to acquire a transposed table; and
   displaying the transposed table on the display apparatus.

2. The table graphics management method according to claim 1, wherein the control track input by the input device comprises:
   with any one point of the rows of the table where the rows do not intersect the columns of the table as a starting point, drawing through a location where the rows containing the starting point intersects the columns and extending to any one point of the columns where the columns do not intersect the rows containing the starting point; or
   with any one point of the columns of the table where the columns do not intersect the rows of the table as a starting point, drawing through a location where the columns containing the starting point intersects the rows and extending to any one point of the rows where the rows do not intersect the columns containing the starting point.

3. The table graphics management method according to claim 1, wherein the input device is a touch input apparatus; and
   the detecting the control track for the table input by the input device comprises detecting a touch track on the touch input apparatus for the table, wherein the touch track is used as the control track for the table.

4. The table graphics management method according to claim 1, wherein the detecting the control track for the table input by the input device comprises:
   detecting a first input location input by the input device; and
   detecting a rotation track that is input by the input device and uses the first input location as a
   rotation point, wherein the rotation track that uses the first input location as the rotation point is used as the control track for the table.

5. A table graphics management apparatus, comprising:
   a displaying module, configured to display a table on a display apparatus, wherein the table has multiple rows and multiple columns, each of the rows comprises multiple frames that are sequentially arranged along a first dimension, each of the column comprises multiple frames that are sequentially arranged along a second dimension, and the second dimension is vertical to the first dimension, wherein the frames of the rows and the columns are filled with information; and further configured to display a transposed table on the display apparatus;
   an input device, configured to receive a control track for the table;
   a detecting module, configured to detect the control track received by the input device, and determine a moving direction of the control track according to the control track; and
   a transposing module, configured to, along the moving direction of the control track detected by the detecting module, transpose original information in the frames of the row that are sequentially arranged along the first dimension into the frames of the columns that are sequentially arranged along the second dimension, and transpose original information in the frames of the column that are sequentially arranged along the second dimension into the frames of the row that are sequentially arranged along the first dimension, so as to acquire the transposed table.

6. The table graphics management apparatus according to claim 5, wherein:
the control track comprises, with any one point of the rows of the table where the rows do not intersect the columns of the table as a starting point, drawing through a location where the rows containing the starting point intersects the columns and extending to any one point of the columns where the columns do not intersect the rows containing the starting point; or
with any one point of the columns of the table where the columns do not intersect the rows of the table as a starting point, drawing through a location where the columns containing the starting point intersects the rows and extending to any one point of the rows where the rows do not intersect the columns containing the starting point.

7. The table graphics management apparatus according to claim 5, wherein the input device is a touch input apparatus; and
accordingly, the detecting module is configured to detect a touch track on the touch input apparatus for the table, wherein the touch track is used as the control track for the table.

8. The table graphics management apparatus according to claim 5, wherein the detecting module is configured to:
detect a first input location input by the input device; and
detect a rotation track that is input by the input device and uses the first input location as a rotation point, wherein the rotation track that uses the first input location as the rotation point is used as the control track for the table.

9. A table graphics management method, comprising:
displaying a table on a display apparatus, wherein the table has multiple rows and multiple columns, each of the rows comprises multiple frames that are sequentially arranged along a first dimension, each of the columns comprises multiple frames that are sequentially arranged along a second dimension, and the second dimension is vertical to the first dimension, wherein the frames of the rows and the columns are filled with information;
receiving a selection input by an input device, and generating a transposing selection frame suspended at the periphery of the table according to the selection, wherein the transposing selection frame comprises a transposing manner option for the rows and the columns of the table;
receiving a selection for the transposing manner option in the transposing selection frame, and performing table transposing in a transposing manner selected according to the selection, so as to acquire a transposed table, wherein the table transposing comprises:
transposing original information in the frames of the row that are sequentially arranged along the first dimension into the frames of the column that are sequentially arranged along the second dimension, and transposing original information in the frames of the column that are sequentially arranged along the second dimension into the frames of the row that are sequentially arranged along the first dimension; and
displaying the transposed table on the display apparatus.

10. The table graphics management method according to claim 9, wherein the receiving the selection input by the input device, and generating the transposing selection frame suspended at the periphery of the table according to the selection comprises:
if table header content in the table is selected, generating the transposing selection frame suspended at the periphery of the table, wherein the table header content refers to identification content set in a frame of the rows or columns and used to redisplay an attribute of information filled in the frame of the rows or columns.

11. The table graphics management method according to claim 9, wherein:
the transposing manner option in the transposing selection frame comprises clockwise transposing and anticlockwise transposing; and
the receiving the selection for the transposing manner option in the transposing selection frame, and performing the table transposing in a transposing manner selected according to the selection comprises, implementing the table transposing in a clockwise direction if a selection for the clockwise transposing is received, and implementing the table transposing in an anticlockwise direction if a selection for the anticlockwise transposing is received.

12. The table graphics management method according to claim 11, wherein:
the clockwise transposing comprises 90-degree clockwise transposing and 270-degree clockwise transposing; and
the implementing the table transposing in the clockwise direction if the selection for the clockwise transposing is received comprises, implementing the table transposing in a 90-degree clockwise direction if a selection for the 90-degree clockwise transposing is received, and
implementing the table transposing in a 270-degree clockwise direction if a selection for the 270-degree clockwise transposing is received.

13. The table graphics management method according to claim 12, wherein:
the implementing the table transposing in the 90-degree clockwise direction if the selection for the 90-degree clockwise transposing is received comprises if the transposing manner selected according to the selection is the 90-degree clockwise transposing, transposing, in a 90-degree clockwise direction, the original information in the frames of the row that are sequentially arranged along the first dimension into the frames of the column that are sequentially arranged along the second dimension, and transposing, in a 90-degree clockwise direction, the original information in the frames of the column that are sequentially arranged along the second dimension into the frames of the row that are sequentially arranged along the first dimension; and
the implementing the table transposing in the 270-degree clockwise direction if the selection for the 270-degree clockwise transposing is received comprises if transposing manner selected according to the selection is the 270-degree clockwise transposing, transposing, in a 270-degree clockwise direction, the original information in the frames of the row that are sequentially arranged along the first dimension into the frames of the column that are sequentially arranged along the second dimension, and transposing, in a 270-degree clockwise direction, the original information in the frames of the column that are sequentially arranged along the second dimension into the frames of the row that are sequentially arranged along the first dimension.

14. The table graphics management method according to claim 11, wherein:
the anticlockwise transposing comprises 90-degree anticlockwise transposing and 270-degree anticlockwise transposing;
the implementing the table transposing in the anticlockwise direction if the selection for the anticlockwise transposing is received comprises, implementing the table transposing in a 90-degree anticlockwise direction if a selection for the 90-degree anticlockwise transposing is received, and implementing the table transposing in a 270-degree anticlockwise direction if a selection for the 270-degree anticlockwise transposing is received.

15. The table graphics management method according to claim 14, wherein:
the implementing the table transposing in the 90-degree anticlockwise direction if the selection for the 90-degree anticlockwise transposing is received comprises if transposing manner selected according to the selection is the 90-degree anticlockwise transposing, 90-degree anticlockwise transposing the original information in the frames of the row that are sequentially arranged along the first dimension into the frames of the column that are sequentially arranged along the second dimension, and 90-degree anticlockwise transposing the original information in the frames of the column that are sequentially arranged along the second dimension into the frames of the row that are sequentially arranged along the first dimension; and
the implementing the table transposing in the 270-degree anticlockwise direction if the selection for the 270-degree anticlockwise transposing is received comprises, if transposing manner selected according to the selection is the 270-degree anticlockwise transposing, 270-degree anticlockwise transposing the original information in the frames of the row that are sequentially arranged along the first dimension into the frames of the column that are sequentially arranged along the second dimension, and 270-degree anticlockwise transposing the original information in the frames of the column that are sequentially arranged along the second dimension into the frames of the row that are sequentially arranged along the first dimension.

16. A non-transitory computer readable medium, comprising computer executable code when executed by a processor causes the processor to implement the following steps:
displaying a table on a display apparatus, wherein the table has multiple rows and multiple columns, each of the rows comprises multiple frames that are sequentially arranged along a first dimension, each of the columns comprises multiple frames that are sequentially arranged along a second dimension, and the second dimension is vertical to the first dimension, wherein the frames of the rows and the columns are filled with information and further configured to display a transposed table on the display apparatus;
receiving a selection input by an input device, and generating a transposing selection frame suspended at the periphery of the table according to the selection, wherein the transposing selection frame comprises a transposing manner option for the rows and the columns of the table; and
receiving a selection for the transposing manner option in the transposing selection frame, and performing table transposing in a transposing manner selected according to the selection, so as to acquire a transposed table, wherein the table transposing comprises:
transposing original information in the frames of the row that are sequentially arranged along the first dimension into the frames of the column that are sequentially arranged along the second dimension, and transposing original information in the frames of the column that are sequentially arranged along the second dimension into the frames of the row that are sequentially arranged along the first dimension.

17. The non-transitory computer readable medium, according to claim 16, wherein:
if table header content in the table is selected, generating the transposing selection frame suspended at the periphery of the table, wherein the table header content refers to identification content set in a frame of the row or columns and used to redisplay an attribute of information filled in the frame of the row or column.

18. The non-transitory computer readable medium, according to claim 16, wherein:
the transposing manner option in the transposing selection frame comprises clockwise transposing and anticlockwise transposing, and
the processor is further configured to implement the table transposing in a clockwise direction if a selection for the clockwise transposing is received, and implement the table transposing in an anticlockwise direction if a selection for the anticlockwise transposing is received.

19. The non-transitory computer readable medium, according to claim 18, wherein:
the clockwise transposing in the transposing selection frame comprises 90-degree clockwise transposing and 270-degree clockwise transposing, and the anticlockwise transposing in the transposing selection frame comprises 90-degree anticlockwise transposing and 270-degree anticlockwise transposing; and
the processor is configured to:
if the transposing manner selected according to the selection is the 90-degree clockwise transposing, 90-degree clockwise transpose the original information in the frames of the rows that are sequentially arranged along the first dimension into the frames of the column that are sequentially arranged along the second dimension, and 90-degree clockwise transpose the original information in the frames of the column that are sequentially arranged along the second dimension into the frames of the row that are sequentially arranged along the first dimension.

20. The non-transitory computer readable medium, according to claim 18, wherein:
the clockwise transposing in the transposing selection frame comprises 90-degree clockwise transposing and 270-degree clockwise transposing, and the anticlockwise transposing in the transposing selection frame comprises 90-degree anticlockwise transposing and 270-degree anticlockwise transposing; and
the processor is configured to:
if the transposing manner selected according to the selection is the 270-degree clockwise transposing, 270-degree clockwise transpose the original information in the frames of the row that are sequentially arranged along the first dimension into the frames of the column that are sequentially arranged along the second dimension, and 270-degree clockwise transpose the original information in the frames of the column that are sequentially arranged along the second dimension into the frames of the row that are sequentially arranged along the first dimension.

21. The non-transitory computer readable medium, according to claim 18, wherein:
the clockwise transposing in the transposing selection frame comprises 90-degree clockwise transposing and 270-degree clockwise transposing, and the anticlockwise transposing in the transposing selection frame comprises 90-degree anticlockwise transposing and 270-degree anticlockwise transposing; and
the processor is configured to:

if the transposing manner selected according to the selection is the 90-degree anticlockwise transposing, 90-degree anticlockwise transpose the original information in the frames of the row that are sequentially arranged along the first dimension into the frames of the column that are sequentially arranged along the second dimension, and 90-degree anticlockwise transpose the original information in the frames of the column that are sequentially arranged along the second dimension into the frames of the row that are sequentially arranged along the first dimension.

22. The non-transitory computer readable medium, according to claim 18, wherein:

the clockwise transposing in the transposing selection frame comprises 90-degree clockwise transposing and 270-degree clockwise transposing, and the anticlockwise transposing in the transposing selection frame comprises 90-degree anticlockwise transposing and 270-degree anticlockwise transposing; and the processor is configured to:

if the transposing manner selected according to the selection is the 270-degree anticlockwise transposing, 270-degree anticlockwise transpose the original information in the frames of the row that are sequentially arranged along the first dimension into the frames of the column that are sequentially arranged along the second dimension, and 270-degree anticlockwise transpose the original information in the frames of the column that are sequentially arranged along the second dimension into the frames of the row that are sequentially arranged along the first dimension.

* * * * *